Jan. 1, 1929.
W. H. DOUGLAS ET AL
1,697,386
VEHICLE STRUCTURE
Filed Sept. 24, 1925    2 Sheets-Sheet 1
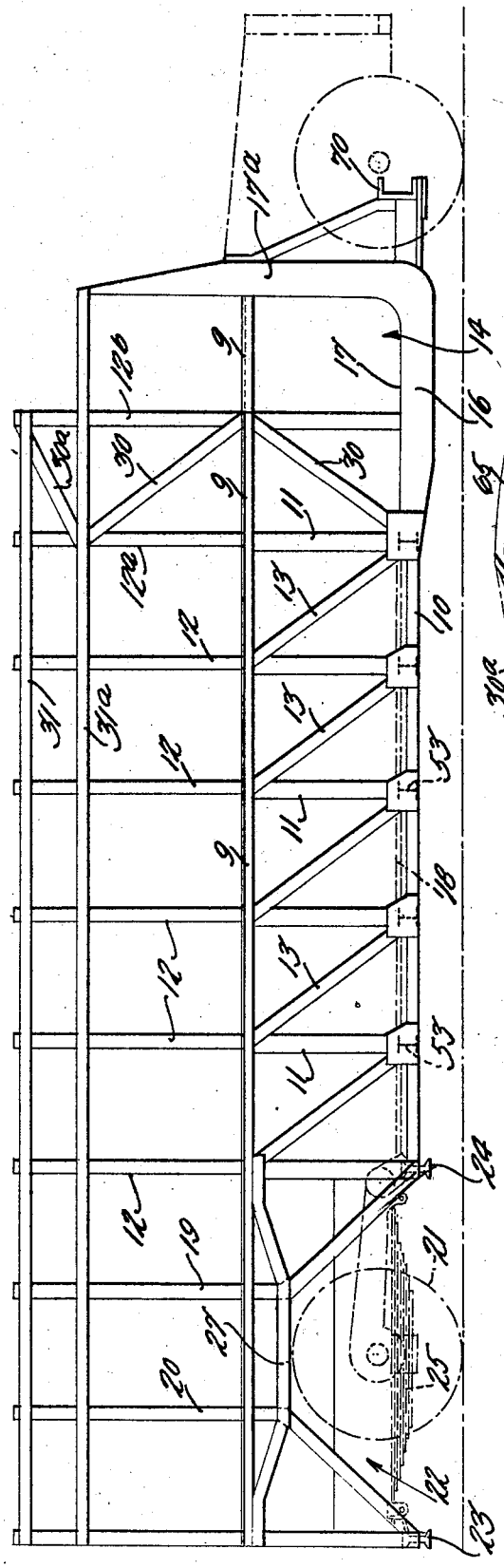
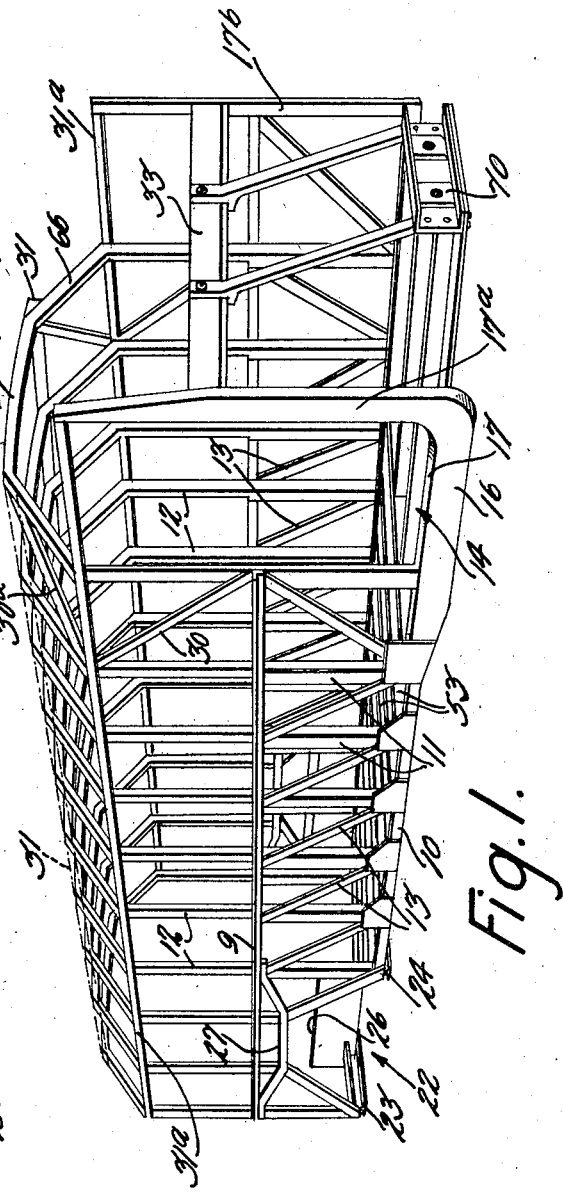
INVENTORS:
WILLIAM H. DOUGLAS
ROLAND CHILTON
ATTORNEY Jan. 1, 1929.　　　　　　　　　　　　　　　　　　1,697,386
W. H. DOUGLAS ET AL
VEHICLE STRUCTURE
Filed Sept. 24, 1925　　　　2 Sheets-Sheet 2
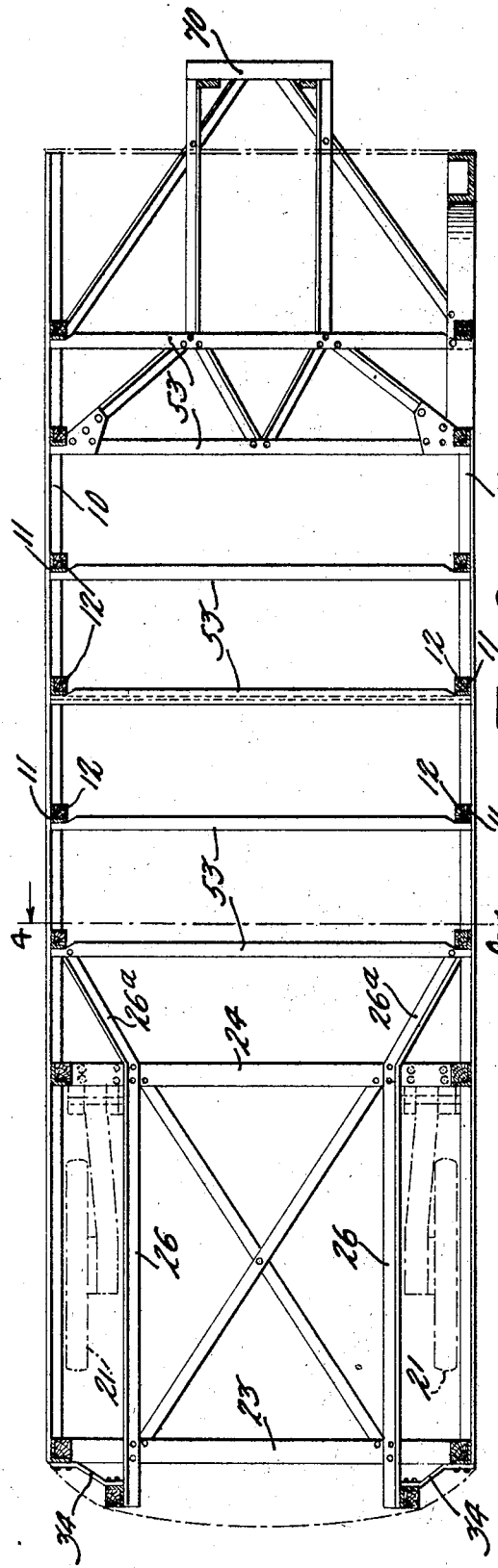
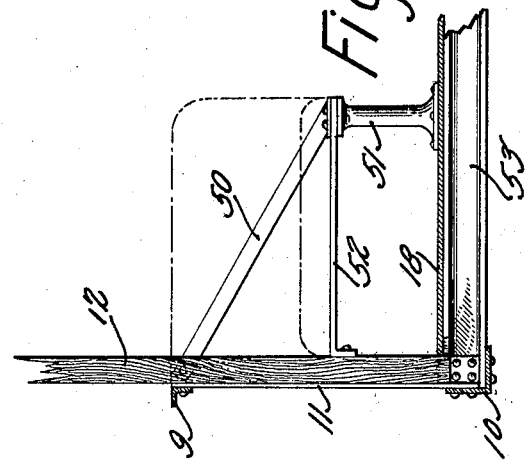
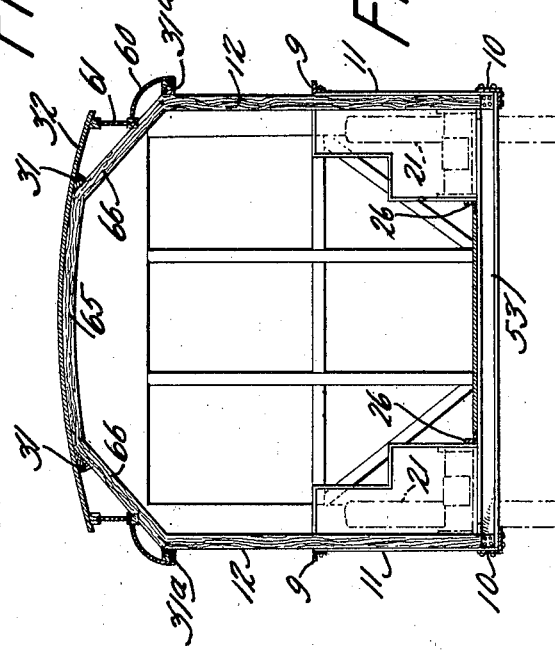
INVENTORS:
WILLIAM H. DOUGLAS
ROLAND CHILTON
BY
ATTORNEY Patented Jan. 1, 1929.

1,697,386

UNITED STATES PATENT OFFICE.

WILLIAM H. DOUGLAS AND ROLAND CHILTON, OF KEYPORT, NEW JERSEY, ASSIGNORS, BY MESNE ASSIGNMENTS, TO HEALEY-AEROMARINE BUS COMPANY, INC., A CORPORATION OF NEW YORK.

VEHICLE STRUCTURE.

Application filed September 24, 1925. Serial No. 58,239.

This invention relates to a combined chassis frame and body structure for use in vehicles such as usually comprise a body mounted upon a separate chassis frame. One of the prime objects of this invention is to achieve a low floor height in conjunction with adequate ground clearance. A further important object is to provide a structure which shall possess great stiffness against both bending and twisting distortions.

In order to avoid obstruction at the doorways, the vehicle floor must be made level with the top of the chassis frame and in a relatively low and long vehicle such as shown in this disclosure, the depth of the chassis frame is apt to be undesirably restricted, leading to a heavy frame section in an endeavor to get adequate stiffness which can only be achieved, in combination with light weight, by the use of a relatively deep frame structure.

The body shapes of road coaches, for instance, afford such depth of structure which is utilized in this invention to obtain extreme stiffness, by the provision of adequate bracing between upper and lower longitudinals of the body to form a trussed structure.

In the absence of such rigid structural bracing the bending stiffness of the construction is merely the aggregate stiffness of the separate longitudinals. Conventional body structures are indeterminate in this respect, since light cover panels are usually tacked or otherwise lightly secured to the longitudinals and so form a structure rigid against light loads, but subject to rapid loosening of the joints under service loads unless flexibility is deliberately incorporated as by a convex panel or sliding panel joints. One of the objects of the present invention on the contrary is to provide a structure which shall be determinate as to stresses on the structural members which may accordingly be proportioned to resist all service loads without distortion at the joints.

In the drawings:—

Figure 1 is a perspective view of the present invention.

Figure 2 is a side elevation of the same.

Figure 3 is a floor plan view.

Figure 4 is a transverse section taken on the line 4—4 of Fig. 3.

Figure 5 is a fragmentary cross sectional view illustrating the manner in which the seat structure provides a truss for the framework.

In the present instance, 9 designates the belt rails or sills which are connected to the lower or floor rails or secondary sills 10 on each side of the vehicle by the lower part 11 of the pillars 12 and the resulting rectangular panels are trussed, preferably by diagonal braces, 13, so as to form a trussed beam or girder having the belt rail 9 for its upper or compression longitudinal member and the floor rail 10 for its bottom or tension longitudinal.

It will be seen that by bracing the belt rail or sill 9 to the floor rail or secondary sill 10 in the manner described, an extremely stiff side structure is provided which projects very little below the floor line 18. In way of the door 14, however, the bracing must be omitted and the frame section beneath the door is restricted as to depth and would possess insufficient rigidly if made as a simple cantilever. In the structure herein disclosed, however, the door sill 17 is carried as a continuous beam upward to the roof by the vertical forward post 17$^a$. The effective length of the cantilever is thus greatly reduced since a point of inflection (i. e. point of no bending moment), occurs about midway of the door sill 17.

The floor rail or lower longitudinal 10 has to be interrupted to accommodate the rear wheel and one of the features of this invention is in the manner in which the strength of the structure is maintained in spite of this discontinuity. It will be seen that the two pillars 19 and 20 over the rear wheels 21 are bent away from each other below the belt rail 9 so as to engage with the bottom of the adjacent pillars to form a structure, triangulated to the side truss and outlining a wheel-house opening 22. Relatively heavy cross beams 23, 24 for the support of the ends of the rear springs 25 are secured to the juncture at the bottom of the vertical and inclined pillars and a longitudinal member 26, spaced inwardly from the side of the body to clear the inside of the wheel, connects the cross-beams 23 and 24 and conveniently forms the heelboard of a longitudinal rear seat. To take local vertical sheer strain between the pillars over the wheel, the belt rail 9 is locally stiffened by increasing its depth to constitute a beam 27 over the wheel house, which beam is triangulated to the side structure by the inclined portion of the wheel house pillars 19, 20. It will be seen that the tensional loads in the bottom longitudinal are transferred to the members 26, and to avoid bending moment on the cross beams, due to this action, diagonal braces 26ª are preferably extended to the side rails.

It will be clear from the foregoing that great vertical bending stiffness is obtained in this structure in virtue of the great height of the framed structure between the belt rail 9 and the lower rail 10 and that special stiffness against vertical bending has been provided even at the one point where the structure is necessarily shallow i. e. under the entrance door 14, and it is to be remarked that conventional chassis frames are limited to this shallow height throughout the whole of their length, while in the present invention, the shallow member 16 occupies only a small percentage of the length of one side, whereat special provisions have been made to reduce the bending deflection.

In addition to extreme strength against vertical bending, rigidity against torsional deflection of the body is one of the objects of this invention. It will be understood that for a body to suffer twisting deformation under uneven load conditions one side must be forced out of parallelism with the other and special provisions are incorporated in this invention to utilize the shearing strength of the floor and roof of the structure to prevent this misalignment. Accordingly a pair of adjacent pillars 12ª and 12ᵇ on each side of the body, preferably towards the front are braced together as by a member 30 to form a vertical extension from the side truss having extreme fore and aft rigidity, the upper end being connected to the roof rails 31.

It will now be seen that the sides of the body cannot get out of their parallel relationship without causing relative horizontal translation between the roof rails 31 or between the floor rails 11. These rails are connected by continuous roof 32 and continuous floor covering 18, which has great shearing strength to resist such horizontal translation. It will be understood that in general, a relatively flat element, such as the side, floor or the roof of a vehicle possesses by itself extremely slight resistance to torsional deflection, but that the continuous floor and roof covering materials necessarily possess relatively great resistance to longitudinal sheer distortion and, therefore, prevent the assembled structure from twisting as a whole, provided the roof rail and floor rail are rigidly tied, so as to resist longitudinal movement within the side structure. In the absence of the vertical truss giving fore and aft stiffness between the belt rail 9 and roof rail 31, the resistance to endwise distortion between these two members is merely the aggregate stiffness of the pillars 12, which in conventional bodies accordingly develop objectionable deflections under body-twisting loads, which are often manifested in loosening up the windows and joints.

Under torsional loading, the reaction from the braced columns will produce a slewing tendency between the roof and the floor, which would tend to move the end pillars sideways from their vertical position. This is provided against at the front of the vehicle by a dash-board structure 33, which maintains the two forward posts 17ª, 17ᵇ, in parallellism, while the corner pillars of the back structure are braced together to give great lateral stiffness.

In the special case of the monitor type of roof chosen for illustration, the sides do not extend directly up to the roof, but are interrupted above the windows, as shown in Figure 4, by the curved roof sides 60 and the vertical monitor sides 61. In order to preserve the strength of the structure in spite of this discontinuous profile, there is provided a special form of roof carline 65 having straight end portions bent downwardly to engage the top of the pillars 12, to which the lower longitudinals 31ª of the monitor are secured. The inclined portions 66 of the carlines thus connect the longitudinal members 31, 31ª, end motion between which is prevented by a diagonal brace 30ª, (Fig. 2) which completes the horizontally rigid connection between the side truss and the roof previously described.

Lateral stiffness of the sides of the body intermediate of the ends is achieved by a special form of bracing adapted to be incorporated in the transverse seats as illustrated in Figure 5. According to this construction a diagonal brace 50 incorporated in the back of a seat disposed adjacent each pillar 12, is secured to the pillars near the belt rail 9 and engages the bottom frame 52 and the leg 51 of the seat to form a rigid corner brace, adapted to maintain the pillars in rigid rectangular relationship with the floor beam 53, and also to resist side deflections of the belt rail or longitudinals 9.

The outrigger 70 at the front of the vehicle is for the purpose of securing a structure (not shown) which carries the front wheels.

Variations may be resorted to within the scope of the invention and portions of the improvements may be used without the others.

Having thus described our invention, we claim:

1. In a vehicle side structure having vertical pillars secured to a belt rail and a floor rail, a wheel house structure comprising, in combination a pair of adjacent pillars spread apart at their lower ends to join thereat the bottom of the next adjacent pillars, cross beams secured to the points of junction, longitudinals connecting the cross beams and disposed inwardly from the side of the body to afford road wheel space and strengthening means for the belt rail over the wheel house.

2. In a vehicle side structure having vertical pillars secured to a belt rail and a floor rail, a wheel house structure comprising, in combination a pair of adjacent pillars spread apart at their lower ends to join thereat the bottom of the next adjacent pillars, cross beams secured to the points of junction, longitudinals connecting the cross beams and disposed inwardly from the side of the body to afford road wheel space and strengthening means for the belt rail over the wheel house, and spring carrying means on the cross members.

3. In a vehicle having a roof rail and a trussed side member terminating at a door rear pillar, a door frame comprising a sill secured to the bottom of the truss and extending forwardly therefrom and a forward vertical door post comprising a continuous beam with the sill and secured at its upper end to the roof rail and means to prevent longitudinal distortion between the roof rail and the truss.

4. In a vehicle having a trussed side member and a roof rail braced against relative end motion, a door frame having horizontal and vertical limbs constituting a bent beam and respectively secured to the truss and the roof rail.

5. In a body having a trussed side structure including vertical pillars, a belt rail, and a floor rail, the combination of a pair of adjacent pillars spread apart at their lower ends and joined to the bottom of the next adjacent pillars, the floor rail terminating at said juncture to provide an opening in the side of the body to accommodate a wheel, a pair of cross members secured to said junctures, a longitudinal member connecting said cross members, and offset from the side of the body to clear the inner side of a wheel, and a truss means for the belt rail above said wheel opening.

6. A vehicle frame structure including a pair of sills, a plurality of frame members secured to said sills and each having a pair of legs depending from said sills, a pair of secondary sills connecting the lower ends of certain of said legs, and springs for said structure mounted adjacent the lower ends of said legs.

Signed at Keyport, in the county of Monmouth and State of New Jersey, this 23rd day of September, A. D. 1925.

WM. H. DOUGLAS.
ROLAND CHILTON.